United States Patent
Guo et al.

(10) Patent No.: US 11,057,471 B2
(45) Date of Patent: Jul. 6, 2021

(54) EDGE APPLICATION MANAGEMENT METHOD AND SYSTEM

(71) Applicant: Xiamen Wangsu Co., Ltd., Xiaman (CN)

(72) Inventors: Xiaochun Guo, Xiamen (CN); Yonghui Lin, Xiamen (CN)

(73) Assignee: Xiamen Wangsu Co., Ltd., Xiamen (CN)

(*) Notice: Subject to any disclaimer, the term of this patent is extended or adjusted under 35 U.S.C. 154(b) by 0 days.

(21) Appl. No.: 16/989,678

(22) Filed: Aug. 10, 2020

(65) Prior Publication Data

US 2021/0092188 A1    Mar. 25, 2021

Related U.S. Application Data

(63) Continuation of application No. PCT/CN2020/074973, filed on Feb. 12, 2020.

(30) Foreign Application Priority Data

Sep. 24, 2019  (CN) .......................... 201910904574.4

(51) Int. Cl.
  *G06F 15/173* (2006.01)
  *H04L 29/08* (2006.01)
(52) U.S. Cl.
  CPC ...... H04L 67/1097 (2013.01); H04L 67/1004 (2013.01); H04L 67/1029 (2013.01)
(58) Field of Classification Search
  CPC ............. H04L 67/1097; H04L 67/1004; H04L 67/1029

USPC ......................................... 709/223, 226, 238
See application file for complete search history.

(56) References Cited

U.S. PATENT DOCUMENTS

| 9,342,328 B2 | 5/2016 | Albano et al. |
| 2013/0290952 A1* | 10/2013 | Childers, Jr. ......... G06F 9/4856 718/1 |
| 2017/0109157 A1 | 4/2017 | Assuncao et al. |
| 2017/0171024 A1* | 6/2017 | Anerousis ............... H04L 67/10 |

(Continued)

FOREIGN PATENT DOCUMENTS

| CN | 102981868 A | 3/2013 |
| CN | 104317642 A | 1/2015 |

(Continued)

OTHER PUBLICATIONS

International Search Report, PCT/CN2020/074973, dated Feb. 12, 2020, 4 pgs.

(Continued)

*Primary Examiner* — Johnny B Aguiar

(57) ABSTRACT

The present disclosure provides an edge application management method and a system. The method includes: generating an edge application template for deploying an edge application managed by an edge cloud node, the edge application template including resource configuration information for deploying an edge cloud node resource, and system application data of an elastic cloud server in a cloud data center; synchronizing the system application data to an edge cloud node to be deployed; and deploying a resource of the edge cloud node to be deployed according to the resource configuration information to realize management of the edge application.

18 Claims, 2 Drawing Sheets

(56) References Cited

U.S. PATENT DOCUMENTS

| | | | | |
|---|---|---|---|---|
| 2017/0289060 A1* | 10/2017 | Aftab | ................ | H04L 41/5054 |
| 2018/0322558 A1* | 11/2018 | Padmanabh | ....... | G06Q 30/0623 |
| 2018/0349124 A1 | 12/2018 | Li et al. | | |
| 2019/0146810 A1 | 5/2019 | Ganesh | | |
| 2020/0186445 A1* | 6/2020 | Govindaraju | ....... | H04L 41/5029 |
| 2020/0218580 A1* | 7/2020 | Kim | ..................... | G06F 9/5077 |

FOREIGN PATENT DOCUMENTS

| | | | |
|---|---|---|---|
| CN | 104506635 | A | 4/2015 |
| CN | 104598525 | A | 5/2015 |
| CN | 107566165 | A | 1/2018 |
| CN | 109451081 | A | 3/2019 |
| CN | 109600269 | A | 4/2019 |
| CN | 109640319 | A | 4/2019 |
| CN | 110225075 | A | 9/2019 |
| CN | 110737442 | A | 1/2020 |

OTHER PUBLICATIONS

Xiamen Wangsu Co., Ltd., First Office Action (CN), CN201910904574.4, dated Oct. 12, 2020, 10 pgs.
Xiamen Wangsu Co., Ltd., Final Office Action (CN), CN201910904574.4, dated Mar. 24, 2021, 4 pgs.
Xiamen Wangsu Co., Ltd., Extended European Search Report, EP20746536.0, dated Feb. 10, 2021, 15 pgs.

* cited by examiner

EDGE APPLICATION MANAGEMENT METHOD AND SYSTEM

CROSS REFERENCE TO RELATED APPLICATIONS

The present application is a continuation of PCT Application No. PCT/CN2020/074973, entitled "EDGE APPLICATION MANAGEMENT METHOD AND SYSTEM", filed Feb. 12, 2020 which claims priority to Chinese patent application No. 201910904574.4, entitled "Edge Application Management Method and System" filed Sep. 24, 2019, each of which is incorporated herein by reference in its entirety.

TECHNICAL FIELD

The present disclosure relates to the field of computer application technology, in particular to an edge application management method and an edge application management system.

BACKGROUND

The emergence of new applications such as the Internet of Things, video intelligent analysis, artificial intelligence, etc., as well as the upcoming 5G era have promoted the rise of edge computing. In this context, in order to improve the quality of services, a service provider may deploy edge applications on the edge side of an operator network. The edge application, which is a general term for a set of systems used to provide services or specific functions to the external, may be composed of an elastic cloud server, an application service deployed on the elastic cloud server, storage data of a preservation system and a load balancing server.

In related technologies, the service provider may build its own edge application by using the existing public cloud mode, thus deploying the edge application on the edge side of the operator. Specifically, when intending to deploy its own edge application on multiple edge cloud nodes (or cloud data centers) provided by a public cloud provider, the service provider needs to switch the multiple edge cloud nodes (or cloud data centers) on a public cloud console to further create resources such as computation, storage, network, etc. After the resources are created, the service provider logins a relevant elastic cloud server to deploy its own edge application to achieve management of the edge application.

In other words, if the service provider needs to deploy the edge applications on 10 edge cloud nodes, the same operation needs to be performed 10 times. Thus, when the service provider needs to deploy 20, 30 or even more edge cloud nodes, the workload of the service provider may be multiplied, resulting in decrease in satisfaction of the service provider with the use of the cloud platform.

SUMMARY

In order to solve the problems in the existing technology, an embodiment of the present disclosure provides an edge application management method and a system. The technical solution is as follows.

In a first aspect, an edge application management method includes: generating an edge application template for deploying an edge application managed by an edge cloud node, the edge application template including resource configuration information for deploying an edge cloud node resource, and system application data of an elastic cloud server in a cloud data center; synchronizing the system application data to an edge cloud node to be deployed; and deploying a resource of the edge cloud node to be deployed according to the resource configuration information to realize management of the edge application.

In a second aspect, an edge application management device or system is provided. The system includes at least one processor and a memory communicatively connected to the at least one processor, the memory stores instructions executable by the at least one processor, and the instructions, when executed by the at least one processor, cause the at least one processor to implement an edge application management method as described in the first aspect.

In a third aspect, a computer-readable storage medium is provided. The computer-readable storage medium stores a computer program, and the computer program is executed by a processor to perform an edge application management method as described in the first aspect.

The embodiments of the present disclosure provide an edge application management method and a device, which may generate an edge application template for deploying an edge cloud node, the edge application template including resource configuration information for deploying an edge cloud node resource, and system application data of an elastic cloud server in a cloud data center; synchronize the system application data to an edge cloud node to be deployed; and deploy a resource of the edge cloud node to be deployed according to the resource configuration information to realize management of the edge application. By applying the solution provided by embodiments of the present disclosure, the edge application managed by the edge cloud node can be uniformly deployed through the edge application template, thus reducing workload of user deployment and difficulty for managing the edge application.

BRIEF DESCRIPTION OF THE DRAWINGS

In order to describe the technical solutions of the embodiments of the present disclosure more clearly, drawings used in the description of the embodiments are briefly described below. It is obvious that the drawings described below are only some embodiments of the present disclosure. For those skilled in the art, further drawings may be obtained in accordance with these drawings without any creative effort.

DETAILED DESCRIPTION

In order to make the objective, the technical solution and the advantages of the present disclosure clearer, embodiments of the present disclosure are further described below in detail with reference to the accompanying drawings.

Figure 1:
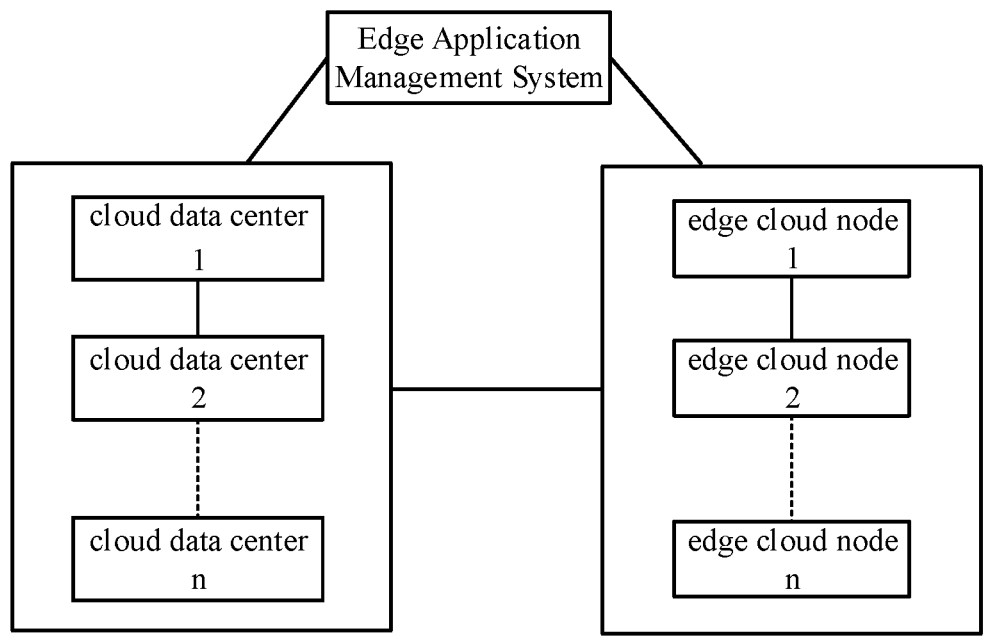
FIG. 1 is a schematic diagram of an edge application management scenario provided by an embodiment of the present disclosure.

An embodiment of the present disclosure provides an edge application management method, which is applicable to a system framework shown in FIG. 1. The system framework includes cloud data centers, edge cloud nodes and an edge application management system.

The functions implemented by the cloud data centers and the edge cloud nodes are basically the same, with the difference that the edge cloud nodes are located on the edge side of the network, that is, the edge cloud nodes are located in different geographic locations from the cloud data centers. Based on this, both the cloud data center and the edge cloud node may be Infrastructure as a Service (IaaS).

The above-mentioned edge application management system includes: a configuration management module configured to collect a resource configuration of a user isolation resource within a logical range of a designated cloud data center as well as system application data, and to form an edge application template. The above-mentioned elastic cloud server may be an elastic cloud server isolated in a virtual private cloud (VPC) within the IaaS, and provide operation commands of the elastic cloud server, such as restart, stop, start, reset password or other functional commands.

The above-mentioned elastic cloud server may also be referred to as a virtual machine, that is, a complete computer system with a complete hardware system function simulated by a software and running in a completely isolated environment.

A data synchronization module is configured to provide a system image of the elastic cloud server and data synchronization of a cloud hard disk, so as to ensure the accuracy and efficiency of the data synchronization.

A resource orchestration module is configured to call a designated cloud data center interface according to the edge application template and create a resource configuration and a networking environment meeting a requirement of the edge application template according to a dependency order of the resources; to perform operations such as fault self-healing and elastic scaling on the elastic cloud server according to an alarm event generated by a monitoring module.

A image upgrade module is configured to upgrade the system image of the elastic cloud server, so as to ensure an accurate and efficient implementation of the upgrade.

A monitoring alarm module provides a monitoring alarm strategy to the user. The user may select and set the monitoring alarm strategy provided by the monitoring alarm module. Correspondingly, the monitoring alarm module is configured to periodically collect performance of an edge cloud resource and monitor the data, and according to a fault processing strategy and an elastic scaling strategy predefined by the user, trigger a callback interface of the strategy and notify the resource orchestration module to carry out corresponding processing when a threshold meets the strategy.

A flow scheduling module is configured to access the edge application managed by the edge cloud node close to the user side when the user at the edge side accesses the edge application management system. Specifically, when the user requests to access a domain name of the edge application management system, the user may parse the nearest edge cloud node according to the geographic location of the user, and direct the user's request to the edge application managed by the nearest edge cloud node to realize a flow scheduling.

In implementation, the configuration management module in the edge application management system calls a cloud data center interface to query resource information of the user isolation resource in the cloud data center to obtain resource configuration information; backs up a system disk and a data disk of the elastic cloud server to obtain the system application data; and uses the resource configuration information and the system application data to generate the edge application template.

The data synchronization module synchronizes the system image of the elastic cloud server in the edge application template and the data of the cloud disk to the edge cloud node.

The resource orchestration module calls the cloud data center interface according to the edge application template, and creates the resource configuration and the networking environment capability that meet a requirement of the template in the edge cloud node according to the dependency order of the resources, so as to realize the management of the edge application.

Figure 2:
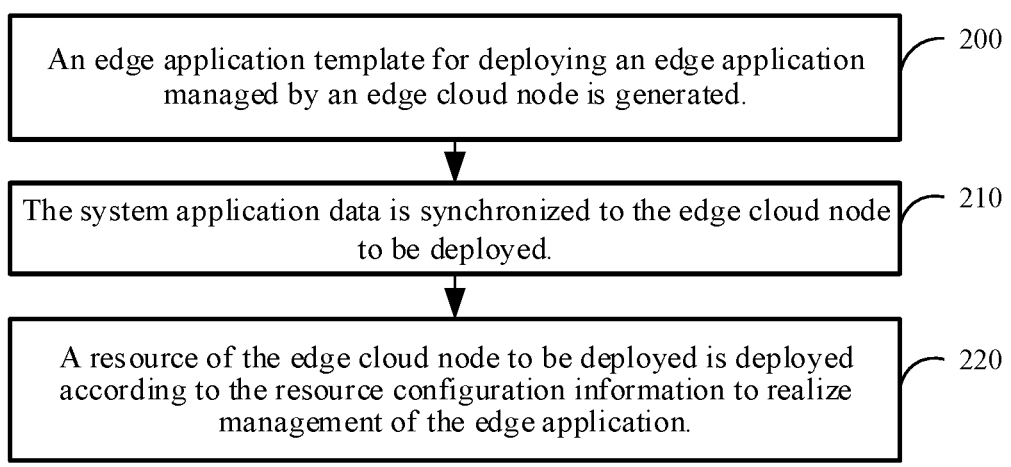
FIG. 2 is a schematic flowchart of an edge application management method provided by an embodiment of the present disclosure.

The flow of an edge application management method shown in FIG. 2 may be described in detail below with reference to specific embodiments. The content may be as follows.

In step 200, an edge application template for deploying an edge application managed by an edge cloud node is generated.

Here, the edge application template includes: resource configuration information for deploying an edge cloud node resource, and system application data of an elastic cloud server in a cloud data center.

The above resource configuration information may include an elastic cloud server specification, an elastic cloud server secret key, an elastic cloud server network, an elastic cloud server security group, a load balancer configuration, a public network line, a cloud hard disk configuration, a Network Attached Storage (NAS) configuration and other information.

The above system application data may include a system image, data of a data disk, etc.

In an embodiment, the above step 200 may include the following steps A1-A3.

In step A1, a cloud data center interface is called to query resource information of a user isolation resource in the cloud data center to obtain the resource configuration information.

In implementation, a calling address of each cloud data center may be registered to the edge application management system in advance, so that the resources of each cloud data center may be managed uniformly. In an embodiment, a user may isolate the resource configuration information of each resource in the cloud data center. For example, the user isolates the resource configuration information such as the elastic cloud server, a load balancer, a storage block, a network attached storage and a public network configuration associated with the elastic cloud server. Correspondingly, the edge application management system may query the resource configuration information of the user isolation resource by calling the cloud data center interface.

In step A2, a system disk and a data disk of the elastic cloud server included in an elastic cloud server list are backed up to obtain the system application data.

The elastic cloud server list is a list of the elastic cloud servers designated by a user for providing the system application data. In implementation, the user may designate, through the elastic cloud server list, one or more elastic cloud servers for providing the system application data.

In step A3, the edge application template is generated using the resource configuration information and the system application data.

In step 210, the system application data is synchronized to an edge cloud node to be deployed.

In implementation, considering that a large amount of flow is required for synchronizing the system image and the data of the data disk to each edge cloud node, serial copying may result in deteriorating the performance and lowering the efficiency, while parallel copying may result in easy filling up of bandwidth of the cloud data center. In an embodiment, the edge cloud node to which the system application data has been synchronized among the edge cloud nodes to be deployed may be used as a data source. The system application data in the data source is synchronized to the edge cloud node to which the system application data has not been synchronized among the edge cloud nodes to be deployed, so as to improve the synchronization efficiency.

For example, when the system image and the data of the data disk in the cloud data center data A are intended to be copied to the edge cloud nodes B, C and D, they may be copied from A to the node B first, and then coped from the A to the C and from the B to the D at the same time by taking both A and B as the data sources.

In another embodiment, a P2P file sharing protocol may also be used to complete the copy of the system image and the data of the data disk to accelerate the transmission efficiency.

In step 220, a resource of the edge cloud node to be deployed is deployed according to the resource configuration information to realize management of the edge application.

In implementation, the cloud data center interface may be called to convert the resource configuration information of each resource into an instruction executable by the edge cloud node, and then the resource may be created according to the dependency order of each resource included in the resource configuration information. Finally, the resource required by all the edge applications managed by the edge cloud node to be deployed may be created to complete the management of the edge application, that is, some cloud services of the cloud data center are smoothly rapidly copied and migrated to the edge cloud node.

In an embodiment, the above step 220 may include the following steps B1-B3.

In step B1, available-resource information of the edge cloud node to be deployed is acquired.

The available-resource information refers to the information of the resource actually owned by the edge cloud node to be deployed. For example, the available-resource information may include the information indicating the size of a memory resource, the size of a bandwidth resource, the number of CPU cores, a storage capacity, etc.

In step B2, the available-resource information is compared with the resource configuration information to determine whether the available-resource information meets a resource requirement defined by the resource configuration information.

In step B3, when the available-resource information meets the resource requirement defined by the resource configuration information, the resource of the edge cloud node to be deployed is deployed according to the resource configuration information.

The available-resource information meets the resource requirement defined by the resource configuration information, that is, the value of the available-resource information is not less than the value of the resource configuration information. For example, if the memory information in the resource configuration information is 2G and the memory information in the available-resource information is 4G, which indicates that the available-resource information meets the resource requirement defined by the resource configuration information. When the available-resource information meets the resource requirement defined by the resource configuration information, the edge cloud node may be deployed directly using the resource configuration information.

In another embodiment, when the available-resource information meets the resource requirement defined by the resource configuration information, the value of the available-resource information may be greater than or equal to the value of the resource configuration information. In this case, in order to make full use of the available resource of the edge cloud node to be deployed, the available-resource information may be used to update the resource configuration information, and then the resource of the edge cloud node to be deployed may be deployed according to the resource configuration information. That is, the resource actually owned by the edge cloud node to be deployed is directly used for deployment. For example, if the memory information in the resource configuration information is 2G and the memory information in the available-resource information is 4G, then the memory of the edge cloud node to be deployed is deployed to 4G, thus making full use of the memory resource.

By applying the solution provided by the embodiments of the present disclosure, the edge application managed by the edge cloud node may be uniformly deployed through the edge application template, thus reducing workload of deployment for the user and difficulty for the management of the edge application.

In implementation, when the elastic cloud server in the cloud data center needs to be upgraded in batch, incremental data may be obtained by using the system image of the upgraded elastic cloud server, and the non-upgraded elastic cloud server may be upgraded in batch by using the incremental data. In this way, the data transmission rate is accelerated and the upgrade efficiency of the elastic cloud server is further increased.

In implementation, the system image included in the system application data in the edge application template may be updated, and then the elastic cloud servers corresponding to each edge cloud node are upgraded in batch by using the updated system image. Specifically, the following steps C1-C4 may be included.

In step C1, a system image included in the system application data in the edge application template is updated to obtain a new system image.

In step C2, an incremental data is obtained according to the new system image and the original system image before updated.

The incremental data refers to the data that the new system image changes compared with the original system image. For example, the incremental data may include the data added compared with the original system image, the data deleted compared with the original system image, the data changed based on the original system image data, etc.

In step C3, the incremental data is synchronized to a designated edge cloud node.

Here, the designated edge cloud node is the edge cloud node where a system image resource is not updated included in an edge cloud node list, and the edge cloud node list is a list of all edge cloud nodes created based on the edge application template. In implementation, all the edge cloud nodes created based on the same edge application template may be recorded in one edge cloud node list.

In the process of upgrading the elastic cloud server in batch, synchronizing only the incremental data may reduce the data transmission and improve the upgrade efficiency.

In step C4, the cloud data center interface of the designated edge cloud node is called, and the elastic cloud server corresponding to the designated edge cloud node is upgraded by using the incremental data.

The elastic cloud server corresponding to the designated edge cloud node is also an elastic cloud server for providing services to the designated edge cloud node.

In implementation, the non-upgraded elastic cloud server may be upgraded by using the incremental data. The non-upgraded elastic cloud server may also be upgraded by using the above-mentioned new system image that is obtained by using the incremental data and the system image of the non-upgraded elastic cloud server.

In implementation, in order to improve the stability of the system operation, the elastic cloud server may be monitored by using the following steps D1-D5. When the elastic cloud server fails, a troubleshooting may be carried out timely to ensure stable operation of the system.

In step D1, performance data for characterizing running performance of the elastic cloud server corresponding to the edge cloud node to be deployed is collected.

The elastic cloud server corresponding to the edge cloud node to be deployed is also an elastic cloud server deployed by using the resource of the edge cloud node to be deployed.

In implementation, the performance data of each elastic cloud server may be collected in real time. The performance data of each elastic cloud server may also be periodically collected according to a predetermined time interval.

The above performance data may include a CPU usage, a memory usage, a server bandwidth data, etc.

In step D2, when the performance data meets conditions of a predetermined alarm strategy, an alarm event is determined.

In implementation, an alarm threshold value for performance data in each type may be set. When values of the performance data reach the predetermined alarm threshold values, it may be determined that the alarm event is generated.

The above alarm event may include server failure, CPU overload, memory resource insufficiency, etc.

In step D3, when the alarm event is a fault event, the elastic cloud server is restarted or rebuilt by using a configuration of a failed elastic cloud server.

In implementation, when the elastic cloud server fails, the elastic cloud server may be restarted, or the elastic cloud server may be deleted, and then a new elastic cloud server is rebuilt by using the configuration of the failed elastic cloud server.

In step D4, when the alarm event is an elastic scaling-up event, one or more elastic cloud servers are created according to a scaling-up strategy, the number of the one or more elastic cloud servers to be created is in a predetermined proportion to the number of the current elastic cloud servers.

The scaling-up strategy is a strategy to increase the number of the elastic cloud servers when the current number of the elastic cloud servers is not enough to meet the needs of the user. For example, when the current CPU usage of each elastic cloud server exceeds 85%, the number of the elastic cloud servers may be increased according to a predetermined proportion. For example, if the current number of the elastic cloud servers is 10 and the predetermined proportion is 20%, then two elastic cloud servers need to be created.

In step D5, when the alarm event is an elastic scaling-down event, one or more elastic cloud servers are deleted according to a scaling-down strategy, the number of the elastic cloud servers to be deleted is in a predetermined proportion to the number of the current elastic cloud servers.

The scaling-down strategy is a strategy to reduce the number of the elastic cloud servers when the current number of the elastic cloud servers is excessive and the utilization rate is low, resulting in a waste of resources.

In implementation, in order to improve the speed of responding to user's requests, after receiving a domain name access request, a geographic location of the user sending the domain name access request may be determined. The domain name access request is directed to the edge application managed by the edge cloud node closest to the geographic location. The edge cloud node closest to the user is used to respond to the user's access requests, thus improving the speed of responding the requests.

By applying the solution provided by embodiments of the present disclosure, the edge cloud node can be uniformly deployed through the edge application template, thus reducing workload of user deployment and difficulty for managing the edge application. Moreover, the incremental data may be obtained by using the system image of the upgraded elastic cloud servers, and the non-upgraded elastic cloud servers are upgraded in batch by using the incremental data. Further, the performance data of the elastic cloud server may be collected. When the elastic cloud server fails, a troubleshooting may be carried out timely to ensure stable operation of the system. And after receiving the domain name access request, the user's access requests are responded to by using the nearest edge cloud node, so as to improve the response speed of the request.

Figure 3:
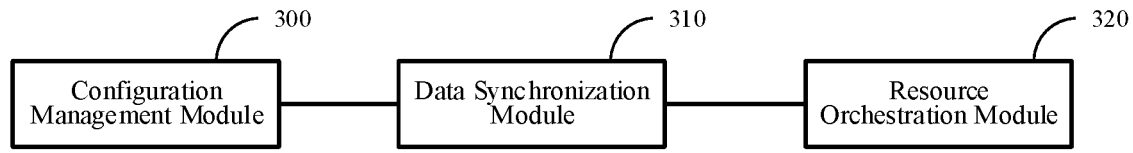
FIG. 3 is a schematic structural diagram of an edge application management system provided by an embodiment of the present disclosure.

Based on the same technical concept, an embodiment of the present disclosure further provides an edge application management system. As shown in FIG. 3, the device includes:

a configuration management module 300, configured to generate an edge application template for deploying an edge application managed by an edge cloud node, the edge application template including resource configuration information for deploying an edge cloud node resource, and system application data of an elastic cloud server in a cloud data center.

a data synchronization module 310, configured to synchronize the system application data to an edge cloud node to be deployed;

a resource orchestration module 320, configured to deploy a resource of the edge cloud node to be deployed according to the resource configuration information to realize management of the edge application.

In some embodiments, the configuration management module 300 is further configured to call a cloud data center interface to query resource information of a user isolation resource in the cloud data center to obtain the resource configuration information; back up a system disk and a data disk of the elastic cloud server included in an elastic cloud server list to obtain the system application data, the elastic cloud server list being a list of the elastic cloud servers designated by a user for providing the system application data; and generate the edge application template by using the resource configuration information and the system application data.

In some embodiments, the data synchronization module 310 is further configured to use the edge cloud node to which the system application data has been synchronized among the edge cloud nodes to be deployed as a data source; and synchronize the system application data in the data source to the edge cloud node to which the system application data has not been synchronized among the edge cloud nodes to be deployed.

In some embodiments, the resource orchestration module 320 is further configured to acquire available-resource information of the edge cloud node to be deployed; compare the available-resource information with the resource configuration information to determine whether the available-resource information meets a resource requirement defined by the resource configuration information; and deploy the resource of the edge cloud node to be deployed according to the resource configuration information when the available-resource information meets the resource requirement defined by the resource configuration information.

In some embodiments, the resource orchestration module 320 is further configured to acquire available-resource information of the edge cloud node to be deployed; compare the available-resource information with the resource configuration information to determine whether the available-resource information meets a resource requirement defined by the resource configuration information; and update the resource configuration information by using the available-resource information when the available-resource information meets the resource requirement defined by the resource configuration information, and deploy the resource of the edge cloud node to be deployed according to the updated resource configuration information.

In some embodiments, the system further includes: an image upgrade module, configured to update a system image included in the system application data in the edge application template to obtain a new system image; obtain incremental data according to the new system image and the original system image before updated; synchronize the incremental data to a designated edge cloud node, the designated edge cloud node being an edge cloud node where a system image resource is not updated included in an edge cloud node list, the edge cloud node list being a list of all edge cloud nodes created based on the edge application template; and call the cloud data center interface of the designated edge cloud node, and upgrade the elastic cloud server corresponding to the designated edge cloud node by using the incremental data.

In some embodiments, the system further includes: a monitoring alarm module, configured to collect performance data for characterizing running performance of the elastic cloud server corresponding to the edge cloud node to be deployed; determine an alarm event when the performance data meets conditions of a predetermined alarm strategy; notify the configuration management module to restart or rebuild the elastic cloud server by using a configuration of a failed elastic cloud server when the alarm event is a fault event; notify the configuration management module to create one or more elastic cloud servers according to a scaling-up strategy when the alarm event is an elastic scaling-up event, the number of the one or more elastic cloud servers to be created being in a predetermined proportion to the number of the current elastic cloud servers; and notify the configuration management module to delete one or more elastic cloud servers according to a scaling-down strategy when the alarm event is an elastic scaling-down event, the number of the elastic cloud servers to be deleted being in a predetermined proportion to the number of the current elastic cloud servers.

In some embodiments, the system further includes: a flow scheduling module, configured to receive a domain name access request; determine a geographic location of a user sending the domain name access request; and direct the domain name access request to the edge application managed by the edge cloud node closest to the geographic position.

By applying the solution provided by embodiments of the present disclosure, the edge application managed by the edge cloud node can be uniformly deployed through the edge application template, thus reducing workload of user deployment and difficulty for managing the edge application. Moreover, the incremental data may be obtained by using the system image of the upgraded elastic cloud servers, and the non-upgraded elastic cloud servers are upgraded in batch by using the incremental data. Further, the performance data of the elastic cloud server may be collected. When the elastic cloud server fails, a troubleshooting may be carried out timely to ensure stable operation of the system. And after receiving the domain name access request, the user's access requests are responded to by using the edge application managed by the nearest edge cloud node, so as to improve the response speed of the request.

Figure 4:
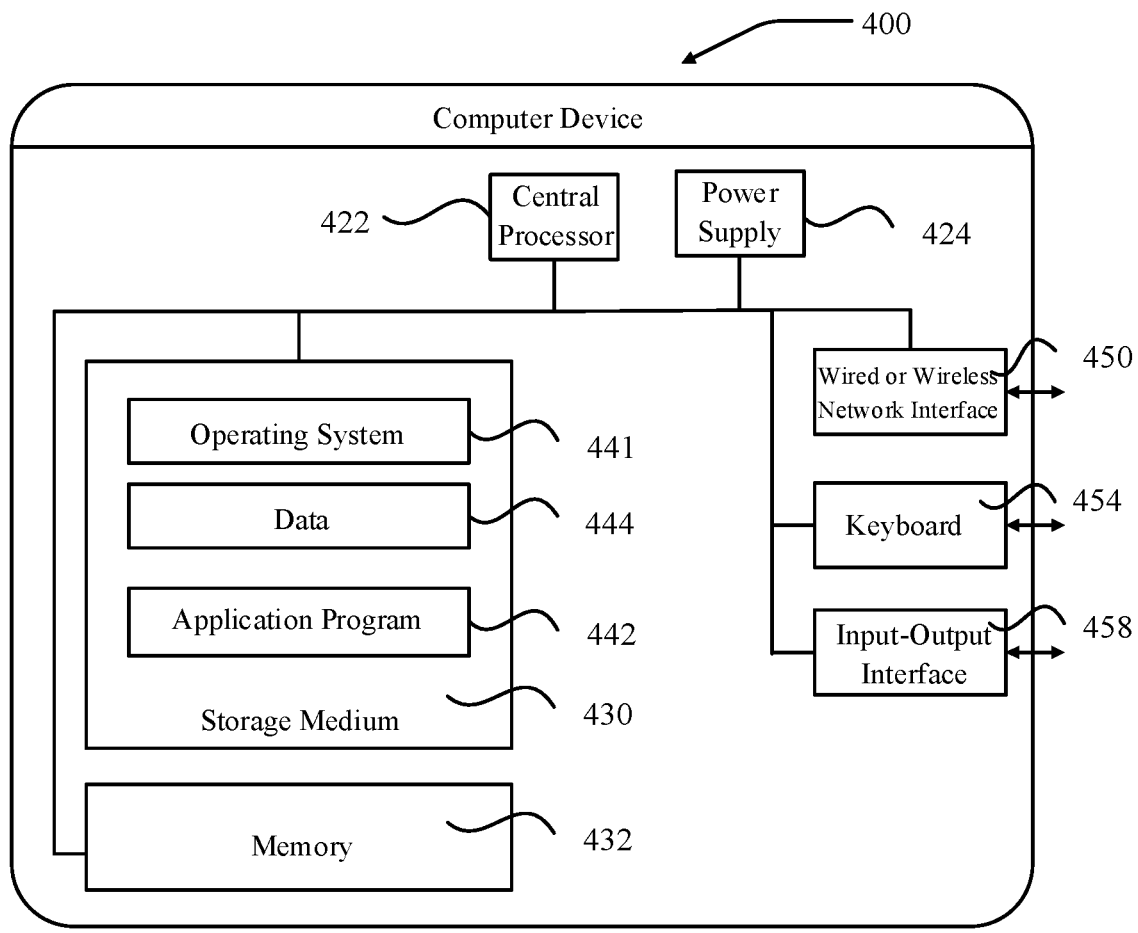
FIG. 4 is a schematic structural diagram of a computer device provided by an embodiment of the present disclosure.

FIG. 4 is a schematic structural diagram of a computer device provided in an embodiment of the present disclosure. The computer device 400 may vary a lot due to different configurations or performances, and may include one or more central processing units 422 (e.g., one or more processors) and a memory 432, one or more storage media 430 (e.g., one or more mass storage devices) that store application programs 442 or data 444. Here, the memory 432 and the storage medium 430 may be temporary storage or persistent storage. Programs stored in the storage medium 430 may include one or more modules (not shown in the drawings), and each module may include a series of instruction operations in the computer device 400. Further, the central processing units 422 may be configured to communicate with the storage medium 430 and execute the series of instruction operations in the storage medium 430 on the computer device 400.

The computer device 400 may further include one or more power sources 424, one or more wired or wireless network interfaces 450, one or more input-output interfaces 458, one or more keyboards 454, and/or, one or more operating systems 441, such as Windows Server™, Mac OS X™, Unix™, Linux™, FreeBSD™, etc.

The computer device 400 may include a memory, and one or more computer programs stored in the memory and configured to be executed by one or more processors to implement the above-mentioned edge application management method. Specifically, the method includes: an edge application template for deploying an edge application managed by an edge cloud node is generated, the edge application template including a resource configuration information for deploying an edge cloud node resource, and system application data of an elastic cloud server in a cloud data center; the system application data is synchronized to the edge cloud node to be deployed; and a resource of the edge cloud node to be deployed is deployed according to the resource configuration information to realize management of the edge application.

Those skilled in the art can understand that all or part of the steps for implementing the above-mentioned embodiments may be completed by a hardware, or may be completed by a program instructing the related hardware. The program may be stored in a computer-readable storage medium. The above-mentioned storage medium may be a read-only memory, a magnetic disk or an optical disk, etc.

It should be noted that when managing the edge application, the edge application management system provided in the above embodiment is only illustrated by the division of the above-mentioned functional modules. In actual applications, the above-mentioned functions may be distributed to and completed by different functional modules as required.

That is, the internal structure of the device is divided into different functional modules to complete all or part of the functions described above. Further, embodiments of the edge application management system and the edge application management method provided in the above embodiments belong to the same concept, and the specific implementation process is detailed in the embodiments of the method and shall not be repeated here.

Those skilled in the art can understand that all or part of the steps for implementing the above-mentioned embodiments may be completed by a hardware, or may be completed by a program instructing the related hardware. The program may be stored in a computer-readable storage medium. The above-mentioned storage medium may be a read-only memory, a magnetic disk or an optical disk, etc.

It should be noted that in this document, relational terms such as first and second, etc. are only used to distinguish one entity or operation from another entity or operation, and do not necessarily require or imply any such actual relationship or order between these entities or operations. Moreover, the terms "include" "contain" or any other variant thereof are intended to cover a non-exclusive inclusion, such that a process, method, article, or device that includes a list of elements includes not only those elements, but also other elements not explicitly listed or inherent to such process, method, article, or device. Without further limitation, the element defined by the statement "includes a . . . " does not exclude the presence of another identical element in the process, method, article or device that includes the element.

The above description is only preferred embodiments of the present disclosure, and is not intended to limit the present disclosure. Any modifications, equivalent substitutions, improvements or the like made within the spirit and principles of the present disclosure are included in the scope of protection of the present disclosure.

What is claimed is:

1. An edge application management method, the method comprising:
   generating an edge application template for deploying an edge application managed by a first edge cloud node, wherein the edge application template comprises resource configuration information for deploying a resource of the first edge cloud node, and system application data of an elastic cloud server in a cloud data center;
   synchronizing the system application data to the first edge cloud node; and
   deploying the resource of the first edge cloud node according to the resource configuration information to realize management of the edge application;
   wherein the step of generating the edge application template for deploying the edge application managed by the first edge cloud node comprises:
   calling an interface of the cloud data center to query resource information of a user isolation resource in the cloud data center to obtain the resource configuration information;
   backing up a system disk and a data disk of the elastic cloud server to obtain the system application data, wherein the elastic cloud server is included in a list of elastic cloud servers designated by a user for providing the system application data; and
   generating the edge application template by using the resource configuration information and the system application data.

2. The method of claim 1, wherein the step of synchronizing the system application data to the first edge cloud node comprises:
   using a second edge cloud node as a data source, wherein the system application data has been synchronized to the second edge cloud node; and
   synchronizing the system application data in the data source to the first edge cloud node.

3. The method of claim 1, wherein the step of deploying the resource of the first edge cloud node according to the resource configuration information comprises:
   acquiring available-resource information of the first edge cloud node;
   comparing the available-resource information with the resource configuration information to determine whether the available-resource information meets a resource requirement defined by the resource configuration information; and
   in response to determining that the available-resource information meets the resource requirement defined by the resource configuration information, deploying the resource of the first edge cloud node according to the resource configuration information.

4. The method of claim 1, wherein the step of deploying the resource of the first edge cloud node according to the resource configuration information comprises:
   acquiring available-resource information of the first edge cloud node;
   comparing the available-resource information with the resource configuration information to determine whether the available-resource information meets a resource requirement defined by the resource configuration information; and
   in response to determining that the available-resource information meets the resource requirement defined by the resource configuration information, updating the resource configuration information by using the available-resource information, and deploying the resource of the first edge cloud node according to the updated resource configuration information.

5. The method of claim 1, further comprising:
   updating a system image included in the system application data in the edge application template to obtain a new system image;
   obtaining incremental data according to the new system image and the system image before being updated;
   synchronizing the incremental data to a designated edge cloud node where a system image resource is not updated, wherein the designated edge cloud node is included in a list of all edge cloud nodes created based on the edge application template; and
   calling an interface of a cloud data center of the designated edge cloud node, and upgrading an elastic cloud server corresponding to the designated edge cloud node by using the incremental data.

6. The method of claim 1, further comprising:
   collecting performance data for characterizing running performance of the elastic cloud server corresponding to the first edge cloud node;
   determining an alarm event when the performance data meets conditions of a predetermined alarm strategy;
   restarting or rebuilding the elastic cloud server by using a configuration of a failed elastic cloud server when the alarm event is a fault event;
   creating one or more first elastic cloud servers according to a scaling-up strategy when the alarm event is an elastic scaling-up event, wherein a number of the one or more first elastic cloud servers to be created is in a first predetermined proportion to a number of current elastic cloud servers; and
deleting one or more second elastic cloud servers according to a scaling-down strategy when the alarm event is an elastic scaling-down event, wherein a number of the one or more second elastic cloud servers to be deleted is in a second predetermined proportion to the number of the current elastic cloud servers.

7. The method of claim 1, further comprising:
receiving a domain name access request;
determining a geographic location of a user sending the domain name access request; and
directing the domain name access request to an edge application managed by an edge cloud node closest to the geographic location.

8. The method of claim 1, wherein the resource configuration information comprises at least one of an elastic cloud server specification, an elastic cloud server secret key, an elastic cloud server network, an elastic cloud server security group, a load balancer configuration, a public network line, a cloud hard disk configuration and a Network Attached Storage (NAS) configuration.

9. The method of claim 1, wherein the system application data comprises a system image and data of a data disk.

10. The method of claim 9, wherein the step of synchronizing the system application data to the first edge cloud node comprises copying the system image and the data of the data disk by using a peer-to-peer (P2P) file sharing protocol.

11. An edge application management device, comprising:
at least one processor; and,
a memory communicatively connected to the at least one processor; wherein,
the memory stores instructions executable by the at least one processor, and the instructions, when executed by the at least one processor, cause the at least one processor to implement an edge application management method;
wherein the method comprises:
generating an edge application template for deploying an edge application managed by a first edge cloud node, wherein the edge application template comprises resource configuration information for deploying a resource of the first edge cloud node, and system application data of an elastic cloud server in a cloud data center;
synchronizing the system application data to the first edge cloud node; and
deploying the resource of the first edge cloud node according to the resource configuration information to realize management of the edge application;
wherein the step of generating the edge application template for deploying the edge application managed by the first edge cloud node comprises:
calling an interface of the cloud data center to query resource information of a user isolation resource in the cloud data center to obtain the resource configuration information;
backing up a system disk and a data disk of the elastic cloud server to obtain the system application data, wherein the elastic cloud server is included in a list of elastic cloud servers designated by a user for providing the system application data; and
generating the edge application template by using the resource configuration information and the system application data.

12. The device of claim 11, wherein the step of synchronizing the system application data to the first edge cloud node comprises:
using a second edge cloud node as a data source, wherein the system application data has been synchronized to the second edge cloud node; and
synchronizing the system application data in the data source to the first edge cloud node.

13. The device of claim 11, wherein the step of deploying the resource of the first edge cloud node according to the resource configuration information comprises:
acquiring available-resource information of the first edge cloud node;
comparing the available-resource information with the resource configuration information to determine whether the available-resource information meets a resource requirement defined by the resource configuration information; and
in response to determining that the available-resource information meets the resource requirement defined by the resource configuration information, deploying the resource of the first edge cloud node according to the resource configuration information.

14. The device of claim 11, wherein step of deploying the resource of the first edge cloud node according to the resource configuration information comprises:
acquiring available-resource information of the first edge cloud node;
comparing the available-resource information with the resource configuration information to determine whether the available-resource information meets a resource requirement defined by the resource configuration information; and
in response to determining that the available-resource information meets the resource requirement defined by the resource configuration information, updating the resource configuration information by using the available-resource information, and deploying the resource of the first edge cloud node according to the updated resource configuration information.

15. The device of claim 11, wherein the method further comprises:
updating a system image included in the system application data in the edge application template to obtain a new system image;
obtaining incremental data according to the new system image and the system image before being updated;
synchronizing the incremental data to a designated edge cloud node where a system image resource is not updated, wherein the designated edge cloud node is included in a list of all edge cloud nodes created based on the edge application template; and
calling an interface of a cloud data center of the designated edge cloud node, and upgrading an elastic cloud server corresponding to the designated edge cloud node by using the incremental data.

16. The device of claim 11, wherein the method further comprises:
collecting performance data for characterizing running performance of the elastic cloud server corresponding to the first edge cloud node;
determining an alarm event when the performance data meets conditions of a predetermined alarm strategy;
restarting or rebuilding the elastic cloud server by using a configuration of a failed elastic cloud server when the alarm event is a fault event;

creating one or more first elastic cloud servers according to a scaling-up strategy when the alarm event is an elastic scaling-up event, wherein a number of the one or more first elastic cloud servers to be created is in a first predetermined proportion to a number of current elastic cloud servers; and deleting one or more second elastic cloud servers according to a scaling-down strategy when the alarm event is an elastic scaling-down event, wherein a number of the one or more second elastic cloud servers to be deleted is in a second predetermined proportion to the number of the current elastic cloud servers.

17. The device of claim 11, wherein the method further comprises:

receiving a domain name access request;

determining a geographic location of a user sending the domain name access request; and directing the domain name access request to an edge application managed by an edge cloud node closest to the geographic location.

18. A non-transitory computer-readable storage medium storing a computer program, wherein the computer program is executed by a processor to perform an edge application management method, and the method comprises:

generating an edge application template for deploying an edge application managed by a first edge cloud node, wherein the edge application template comprises resource configuration information for deploying a resource of the first edge cloud node, and system application data of an elastic cloud server in a cloud data center;

synchronizing the system application data to the first edge cloud node; and deploying the resource of the first edge cloud node according to the resource configuration information to realize management of the edge application;

wherein the step of generating the edge application template for deploying the edge application managed by the first edge cloud node comprises:

calling an interface of the cloud data center to query resource information of a user isolation resource in the cloud data center to obtain the resource configuration information;

backing up a system disk and a data disk of the elastic cloud server to obtain the system application data, wherein the elastic cloud server is included in a list of elastic cloud servers designated by a user for providing the system application data; and generating the edge application template by using the resource configuration information and the system application data.

\* \* \* \* \*